(12) United States Patent
Higuchi et al.

(10) Patent No.: US 11,465,500 B2
(45) Date of Patent: Oct. 11, 2022

(54) DISPLAY METHOD AND DISPLAY SYSTEM FOR HYBRID VEHICLE

(71) Applicant: Nissan Motor Co., Ltd., Yokohama (JP)

(72) Inventors: Shinsuke Higuchi, Kanagawa (JP); Kazuma Sengoku, Kanagawa (JP); Keisuke Kawai, Kanagawa (JP); Ryuji Kurosaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 271 days.

(21) Appl. No.: 16/771,985

(22) PCT Filed: Dec. 15, 2017

(86) PCT No.: PCT/JP2017/045209
§ 371 (c)(1),
(2) Date: Jun. 11, 2020

(87) PCT Pub. No.: WO2019/116575
PCT Pub. Date: Jun. 20, 2019

(65) Prior Publication Data
US 2020/0398666 A1    Dec. 24, 2020

(51) Int. Cl.
*B60K 35/00* (2006.01)
*B60K 6/24* (2007.10)
*B60K 6/26* (2007.10)

(52) U.S. Cl.
CPC ............ *B60K 35/00* (2013.01); *B60K 6/24* (2013.01); *B60K 6/26* (2013.01);
(Continued)

(58) Field of Classification Search
None
See application file for complete search history.

(56) References Cited

U.S. PATENT DOCUMENTS 9,156,355 B2 * 10/2015 Choi ................ B60W 20/50
9,613,473 B2 *  4/2017 Hartl ................ G07C 5/0825
(Continued)

FOREIGN PATENT DOCUMENTS

DE    102014018138 A1 *  6/2016
EP        1953022 A1 *  8/2008  ............ B60K 35/00
(Continued)

OTHER PUBLICATIONS

IPER PCT/JP 2017/045209 (Year: 2021).*
Written Opinion KR 20207017381 (Year: 2021).*

*Primary Examiner* — Dirk Wright
(74) *Attorney, Agent, or Firm* — Young Basile Hanlon & MacFarlane, P.C.

(57) ABSTRACT

A display method for a hybrid vehicle includes displaying an engine icon representing the engine, a battery icon representing the battery, and a flow icon representing an energy flow between the engine icon and the battery icon on a display unit in accordance with a driving state of the hybrid vehicle. The display method includes displaying the flow icon in a display mode indicating that there is the energy flow between the engine and the battery when the battery is charged. The display method includes displaying the engine icon in a first display mode when the engine is stopped, displaying the engine icon in a second display mode when the engine is operated at engine rotation speed equal to or lower than reference rotation speed, and displaying the engine icon in a third display mode when the engine rotation speed is higher than the reference rotation speed.

14 Claims, 8 Drawing Sheets

(52) U.S. Cl.
CPC .. *B60K 2370/152* (2019.05); *B60K 2370/171* (2019.05); *B60Y 2200/92* (2013.01)

(56) References Cited

U.S. PATENT DOCUMENTS

| | | | |
|---|---|---|---|
| 10,474,337 B2 * | 11/2019 | Yamauchi | G06F 3/04845 |
| 2010/0057281 A1 * | 3/2010 | Lawyer | G07C 5/0825 |
| | | | 701/123 |
| 2010/0305795 A1 * | 12/2010 | Kuang | B60K 35/00 |
| | | | 180/65.21 |
| 2013/0090792 A1 | 4/2013 | Eom et al. | |
| 2013/0278404 A1 | 10/2013 | Choi | |

FOREIGN PATENT DOCUMENTS

| | | | | | |
|---|---|---|---|---|---|
| EP | 2662232 A1 | * | 11/2013 | ............ | B60K 35/00 |
| FR | 3013643 A1 | * | 5/2015 | ............ | B60K 35/00 |
| JP | H11-159380 A | | 6/1999 | | |
| JP | H11220803 A | * | 8/1999 | | |
| JP | 3018958 B2 | * | 3/2000 | | |
| JP | 2000-247164 A | | 9/2000 | | |
| JP | 2007-050889 A | | 3/2007 | | |
| JP | 2008-074326 A | | 4/2008 | | |
| JP | 2009-137553 A | | 6/2009 | | |
| JP | 2010011525 A | * | 1/2010 | | |
| JP | 2015-055163 A | | 3/2015 | | |
| JP | 2016-078662 A | | 5/2016 | | |
| KR | 10-2011-0083331 A | | 7/2011 | | |
| KR | 20110083331 A | * | 7/2011 | | |
| KR | 20120086976 A | * | 8/2012 | | |
| KR | 10-2013-0036948 A | | 4/2013 | | |
| KR | 10-2013-0119771 A | | 11/2013 | | |

\* cited by examiner

DISPLAY METHOD AND DISPLAY SYSTEM FOR HYBRID VEHICLE

TECHNICAL FIELD

The present invention relates to a display method and a display system for a hybrid vehicle.

BACKGROUND ART

JP2007-050889A discloses a driving state display device for a hybrid vehicle, the driving state display device displaying energy flows between an engine and a driving wheel, between an electric motor and a driving wheel, between the engine and the electric motor, and between the electric motor and a battery, respectively.

SUMMARY OF INVENTION

The above-mentioned driving state display device is configured to display a state in which power of the engine or the electric motor is transmitted to the driving wheel, and a state where power generation control for the electric motor is performed based on power of the engine. However, it is not possible to grasp in what type of driving state the engine is being controlled.

Especially, in a series hybrid vehicle in which a generator is driven by an engine and an electric motor is driven by electric power of a battery so as to cause the vehicle to travel, engine control is performed in various scenes. Therefore, it is not possible to easily grasp a driving state of the engine by simply looking at the energy flow.

Therefore, an object of the invention is to provide a display technique in a hybrid vehicle, the display technique realizing an energy flow display associated with engine rotation speed.

According to an aspect of the invention, a display method for displaying at least an energy flow between an engine and a battery in a hybrid vehicle is provided. The hybrid vehicle includes a generator configured to charge the battery using power of the engine and an electric motor configured to drive a driving wheel based on electric power of the battery. The display method includes, displaying an engine icon representing the engine, a battery icon representing the battery, and a flow icon between the engine icon and the battery icon representing the energy flow on a display unit in accordance with a driving state of the hybrid vehicle, displaying the flow icon in a display mode indicating that there is the energy flow between the engine and the battery when the battery is charged. The display method further includes displaying the engine icon in a first display mode when the engine is stopped, displaying the engine icon in a second display mode different from the first display mode when the engine is operated at engine rotation speed equal to or lower than reference rotation speed, and displaying the engine icon in a third display mode different from the first and second display modes when the engine rotation speed is higher than the reference rotation speed.

DESCRIPTION OF EMBODIMENTS

Hereinafter, an embodiment of the invention is described with reference to the drawings.

Figure 1:
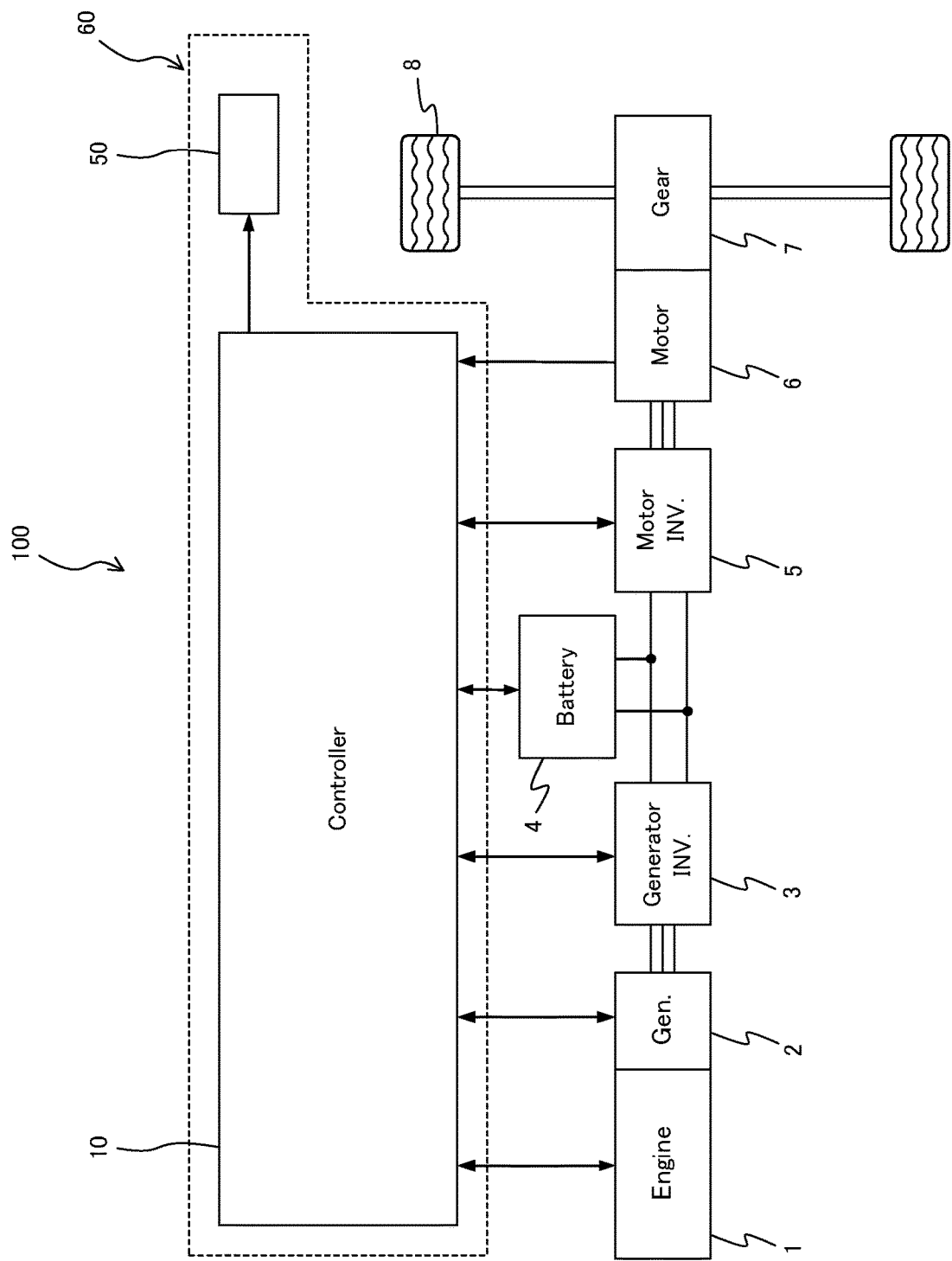
FIG. 1 is a view showing a schematic configuration of a hybrid vehicle in which an energy flow display method according to this embodiment is performed.

FIG. 1 is a view showing a schematic configuration of a hybrid vehicle 100 in which an energy flow display method according to this embodiment is performed.

As shown in FIG. 1, the hybrid vehicle 100 includes an engine 1, a generator 2, a generator inverter 3, a battery 4, a motor inverter 5, an electric motor 6, a decelerator 7 (transmission), driving wheels 8, a display unit 50 (display device) that configures a part of a display system 60, and a controller 10 that controls various devices. The hybrid vehicle 100 is configured as a so-called series hybrid vehicle in which electric power generated by the generator 2 with use of power of the engine 1 is supplied to the battery 4, and the electric motor 6 is rotated based on electric power of the battery 4, thereby driving the driving wheels 8. Therefore, in the hybrid vehicle 100, the engine 1 is used as a power source that causes the generator 2 to generate electric power, instead of a power source for the vehicle to travel.

The engine 1 that configures the hybrid vehicle 100 is a so-called an internal combustion engine in which gasoline or the like is used as fuel, and the engine 1 is mechanically connected with the generator 2 through a non-illustrated gear. The engine 1 is used as a driving source that drives and rotates the generator 2 at the time of charge of the battery 4 or the like.

The generator 2 is configured so as to generate electric power by rotating based on power from the engine 1, and thus able to charge the battery 4. Also, the generator 2 is configured so as to be driven to rotate by electric power of the battery 4, thereby causing power running (motoring) of the engine 1. The motoring control by which the engine 1 is rotated with use of power of the generator 2 is performed when cranking the engine 1 in starting the engine, when negative pressure is generated in an intake passage by closing a throttle valve when negative pressure for assisting a brake pedal is necessary, and when consumption of electric power is desired in order to prevent excessive charge of the battery. As described earlier, the generator 2 functions as a so-called motor generator.

The generator inverter 3 is electrically connected to the generator 2, the battery 4, and the motor inverter 5. The generator inverter 3 converts alternating-current electric power generated by the generator 2 into direct-current electric power, and supplies the direct-current electric power to the battery 4 and the motor inverter 5. The generator inverter 3 converts direct-current electric power output from the battery 4 into alternating-current electric power, and supplies the alternating-current electric power to the generator 2.

The motor inverter 5 is electrically connected to the generator inverter 3, the battery 4, and the electric motor 6. The motor inverter 5 converts direct-current electric power output from the battery 4 and the generator inverter 3 into alternating-current electric power, and supplies the alternating-current electric power to the electric motor 6. The motor inverter 5 converts alternating-current electric power regenerated by the electric motor 6 into direct-current electric power, and supplies the direct-current electric power to the battery 4.

The electric motor 6 is driven to rotate by alternating current supplied from the motor inverter 5, and transmits driving force to the driving wheels 8 through the decelerator. Also, the electric motor 6 generates electric power when the electric motor 6 is rotated with the driving wheels 8 when the vehicle is decelerating, in a coast traveling, or the like. Thus, kinetic energy of the vehicle is recovered in the battery 4 as electric energy. As described above, the electric motor 6 functions as a motor generator.

The controller 10 is configured by a microcomputer that includes a central processing unit (CPU), a read only memory (ROM), a random access memory (RAM), and an input/output interface (I/O interface). By performing a specific program, the controller 10 functions as a control unit that controls operations of various devices such as the engine 1, the generator 2, the generator inverter 3, and the motor inverter 5. The controller 10 may be configured by a plurality of microcomputers instead of being configured by a single microcomputer.

The controller 10 controls a throttle valve, an injector, an ignition plug, and so on of the engine 1 in accordance with state signals regarding rotation speed and a load (torque) of the engine 1, and adjusts an intake air amount, a fuel injection amount, an ignition timing, and so on.

The controller 10 calculates a state of charge (SOC) of the battery 4 based on current and voltage when the battery 4 is charged or discharged, and calculates electric power that can be input to the battery 4 and electric power that can be output from the battery 4 by using the calculated SOC information, and so on.

In accordance with vehicle state information including an acceleration position (accelerator opening degree), vehicle speed, road surface gradient and so on, the SOC information, and information regarding electric power that can be input to the battery 4, electric power that can be output form the battery 4 and so on, the controller 10 computes a motor torque command value to the electric motor 6, and also computes target generated electric power to be supplied from the generator 2 to the battery 4 or to the electric motor 6. Further, the controller 10 performs switching control of the motor inverter 5 so that torque of the electric motor 6 becomes the motor torque command value.

Further, the controller 10 computes an engine torque command value for the engine 1 and a rotation speed command value for the generator 2 in order to realize the target generated electric power. The controller 10 performs switching control of the generator inverter 3 in accordance with a state of the rotation speed detection value of the generator 2 and so on so that generator rotation speed coincides with the rotation speed command value.

The foregoing hybrid vehicle 100 includes a display system 60 that displays an energy flow showing a flow of electric power between the engine 1 and the battery 4, and between the battery 4 and the electric motor 6 that drives the driving wheels 8, so that a driver or the like is able to recognize a driving state of the vehicle. The display system 60 includes a display unit 50 arranged inside a vehicle cabin of the hybrid vehicle 100 and the controller 10 that performs control pertaining to image display on the display unit 50. A simplified display may be used where display of the energy flow between the battery 4 and the electric motor 6 is omitted, and only the electric power generation state by the engine 1 may be recognized by the driver.

Figure 2:
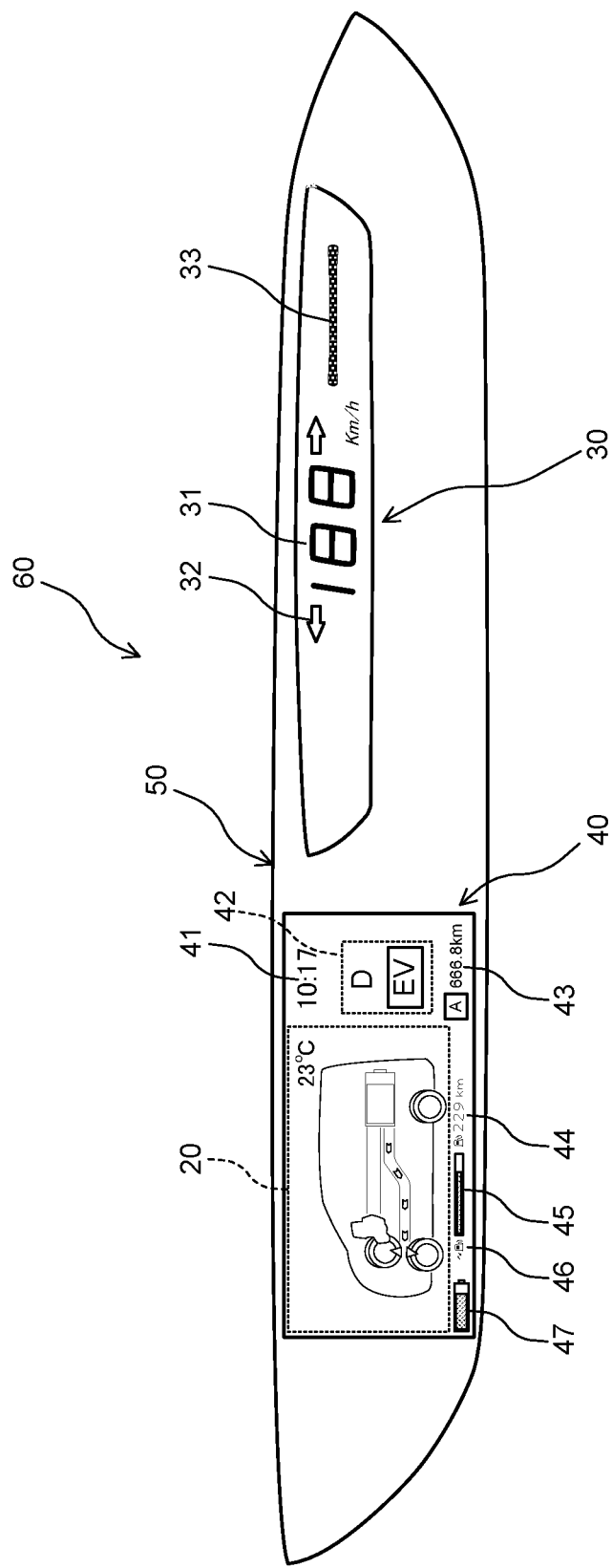
FIG. 2 is a view showing an example of a display unit of a display system installed in the hybrid vehicle.

FIG. 2 is a view showing an example of a display screen of the display unit 50 of the display system 60.

The display unit 50 shown in FIG. 2 is configured by a display incorporated in an instrument panel arranged in a front part of the vehicle cabin of the hybrid vehicle 100. A display function of the display unit 50 can be realized by various image display devices such as a liquid crystal display, an organic EL, and an LED. The display unit 50 is configured so as to perform display based on a display control signal from the controller 10.

The display unit 50 has a first display region 30 that is positioned in a rightward position in FIG. 2, and a second display region 40 positioned in a leftward position in FIG. 2.

The first display region 30 includes a vehicle speed display part 31 that displays current vehicle speed of the hybrid vehicle 100, and a direction indication display part 32 that is displayed when the hybrid vehicle 100 turns right or left. Further, an eco-level gauge 33 is displayed in the right part of the first display region 30, indicating a level of eco-driving of the hybrid vehicle 100. The eco-level is an indicator that indicates in stages a level of electric power economy (energy consumption efficiency) in the current driving state of the hybrid vehicle 100. In this embodiment, as the eco-level gauge 33 is displayed so as to extend and contract in accordance with an increase and a decrease of the eco-level according to a motor output, it is possible to provide an indicator showing the driver the current degree of eco-driving.

The second display region 40 includes a vehicle state display part 20, a time display part 41 that displays current time, and a traveling mode display part 42 that displays a currently-set traveling mode and a range position of a shift lever. Further, the second display region 40 includes a trip information display part 43 that shows a travel distance while the vehicle is in a trip, a distance-to-empty display part 44 that shows a distance to empty based on an remaining amount of fuel stored in a fuel tank for the engine 1 to generate electric power, a remaining fuel amount display part 45 that shows a remaining amount of fuel inside the fuel tank, a fuel filler opening position display part 46 that shows a position (a right-side position or a left-side position) at which a fuel filler opening is installed, and a charge amount display part 47 that displays a charge amount (the SOC) of the battery 4.

In the vehicle state display part 20 of the second display region 40, a given vehicle state display out of a plurality of types of vehicle state displays can be selectively displayed by an operation of the driver or the like. The plurality of types of vehicle state displays include an energy flow display that shows energy flows between the engine 1 and the battery 4 and between the battery 4 and the driving wheels 8, respectively, a power meter display that shows a driving output amount and a regeneration amount by the electric motor 6, a charge history information display that shows a history of a charge amount by charging with use of the engine 1 and regeneration charging with use of the electric motor 6, and so on. In this embodiment, an example is described in which the energy flow display is shown on the vehicle state display part 20.

Figure 3:
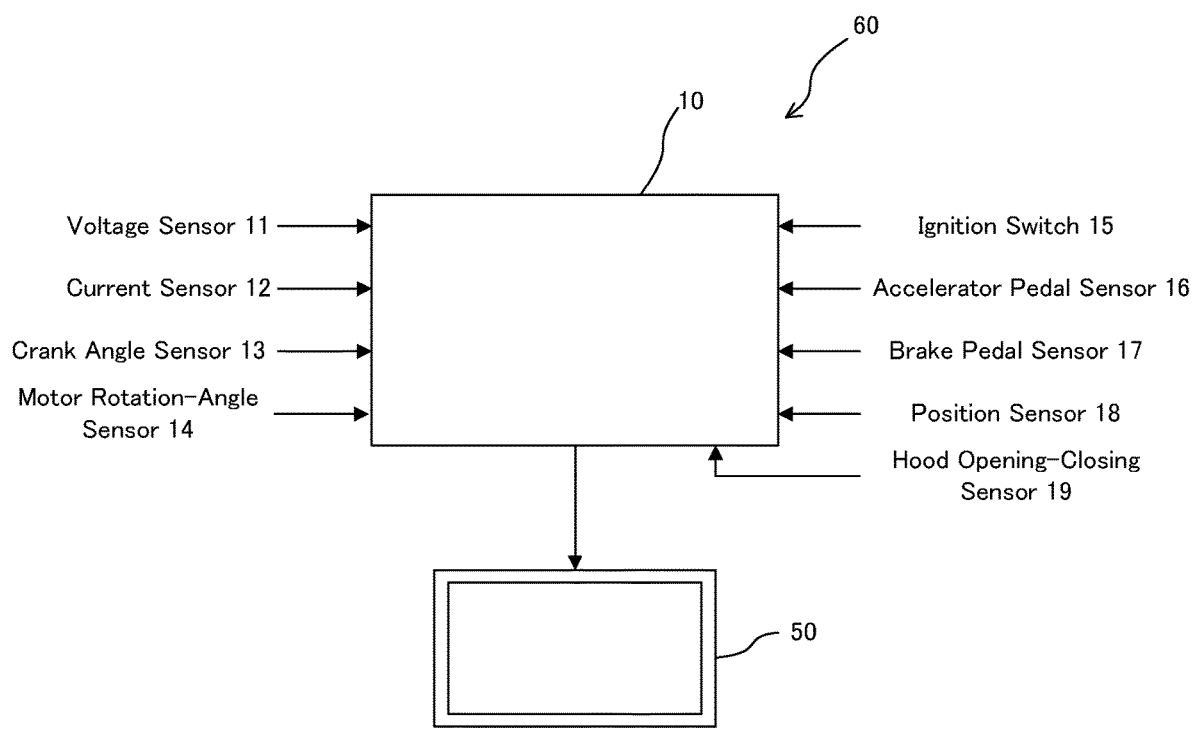
FIG. 3 is a schematic configurational view of the display system installed in the hybrid vehicle.

As shown in FIG. 3, the controller 10 that configures a part of the display system 60 is electrically connected to various sensors that detect a driving state of the hybrid vehicle 100. The various sensors include a voltage sensor 11, a current sensor 12, a crank angle sensor 13, a motor rotation angle sensor 14, an ignition switch 15, an accelerator pedal sensor 16, a brake pedal sensor 17, a position sensor 18, a hood opening-closing sensor 19, and so on. These sensors are an example of sensors that detect the driving state of the vehicle, and connection between the controller 10 and a sensor other than the above sensors is not excluded.

The voltage sensor 11 and the current sensor 12 are provided in the battery 4, and detect battery voltage and battery current, respectively, at the time of charging and discharging.

The crank angle sensor 13 is provided in the engine 1, and detects a rotation position of a crankshaft of the engine 1. The motor rotation angle sensor 14 is provided in the electric motor 6, and detects a rotation position of a rotor of the electric motor 6. The controller 10 calculates engine rotation speed based on a detection signal of the crank angle sensor 13, and calculates motor rotation speed based on a detection signal of the motor rotation angle sensor 14.

The ignition switch 15 is a power switch that is operated by the driver or the like in order to allow the hybrid vehicle 100 to travel.

The accelerator pedal sensor 16 is a sensor that detects a depression amount of an accelerator pedal provided in the hybrid vehicle 100, and the brake pedal sensor 17 is a sensor that detects a depression amount of a brake pedal provided in the hybrid vehicle 100. The depression amount of the accelerator pedal is vehicle state information that represents a load on the electric motor 6, and the depression amount of the brake pedal is vehicle state information that represents a brake amount.

The position sensor 18 is a sensor that detects a range position of the shift lever provided in the hybrid vehicle 100. The range position of the shift lever includes a parking range (a P range), a neutral range (an N range), a forward traveling range (a D range), a rearward traveling range (an R range), and so on.

The hood opening-closing sensor 19 is a sensor that detects an opening and closing state of a hood (a bonnet) that covers an engine room (a chamber) that accommodates the engine 1 and the electric motor 6 provided in a front part or the like of the hybrid vehicle 100.

The controller 10 computes energy flow information that indicates an electric power supply state between the engine 1 and the battery 4, an electric power supply state between the battery 4 and the electric motor 6, and so on based on detection signals from various sensors described above, and also computes a display command signal for controlling the display unit 50 based on the energy flow information and so on. On the vehicle state display part 20 (see FIG. 2) of the display unit 50, various kinds of information regarding the energy flow is displayed based on the display control signal from the controller 10. The energy flow information includes generated electric power by the generator 2, driving electric power supplied to the electric motor 6, regenerative electric power by the electric motor 6, and so on.

With reference to FIG. 4 to FIG. 7, the energy flow display on the vehicle state display part 20 of the display unit 50 in various driving states of the hybrid vehicle 100 is described. A series of energy flow displays described below is realized as the controller 10 performs a given program and controls the display unit 50.

Figure 4:
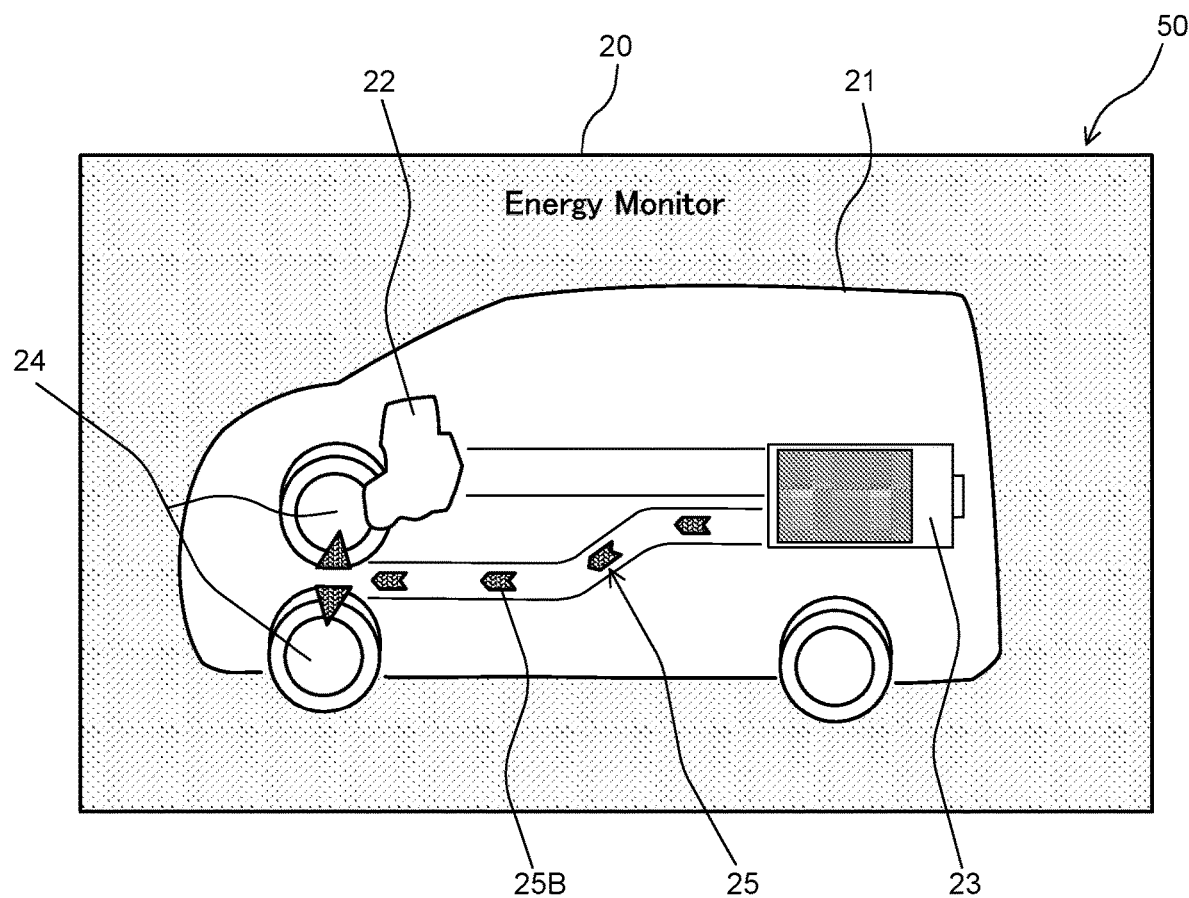
FIG. 4 is a view showing a display state of the display unit in a case where the hybrid vehicle is traveling by an electric motor in a state where an engine is stopped.

FIG. 4 is a view showing a display state of the vehicle state display part 20 in a state where the engine 1 is stopped and when the hybrid vehicle 100 is traveling by the electric motor 6.

As shown in FIG. 4, when an energy monitor is selected on the vehicle state display part 20 of the display unit 50 by an operation of the driver or the like, the vehicle state display part 20 displays, as a basic display of the energy flow display, an vehicle icon 21 representing the hybrid vehicle 100, an engine icon 22 representing the engine 1, an battery icon 23 representing the battery 4, and a driving wheel icon 24 representing the driving wheel 8. Also, the vehicle state display part 20 displays flow icons 25 between the engine icon 22 and the battery icon 23 and between the battery icon 23 and the driving wheel icon 24, the flow icons 25 representing energy flows in accordance with the vehicle driving state.

The engine icon 22 is an icon imitating an engine shape and displayed so as to overlap a front part of the vehicle icon 21. A color (a display mode) of the engine icon 22 displayed on the vehicle state display part 20 is changed in accordance with engine rotation speed calculated based on the detection signal of the crank angle sensor 13.

The battery icon 23 is an icon imitating a battery shape and being imaged as a battery, and is displayed so as to overlap a rear part of the vehicle icon 21. The battery icon 23 displays a charge amount of the battery in accordance with the calculated value of the SOC calculated based on the detection signals of the voltage sensor 11 and the current sensor 12. The battery icon 23 is configured so that a current charge amount of the battery is recognized as a bar graph display inside the icon, and, as the calculated value of the SOC increases, the bar graph display extends. For example, the bar graph display of the battery icon 23 is shown in blue when the calculated value of the SOC is larger than a lower-limit charge value, and is shown in yellow when the calculated value of the SOC is equal to or lower than the lower-limit charge value.

The driving wheel icon 24 is an icon imitating a shape of a front wheel of the vehicle, and is displayed as an icon (a vehicle driving part icon) that configures a part of the vehicle icon 21. In the driving wheel icon 24 displayed on the vehicle state display part 20, a rotation state of the driving wheel icon 24 is changed in accordance with motor rotation speed calculated based on the detection signal from the motor rotation angle sensor 14. For example, the driving wheel icon 24 is configured so that its rotation displayed becomes higher as the motor rotation speed increases.

The flow icons 25 are displayed as arrow-shaped icons that indicate a direction of the electric power supply between the engine 1 and the battery 4, and a direction of the electric power supply between the battery 4 and the driving wheel 8. The flow icons 25 include a flow icon 25A (see FIG. 6) displayed between the engine icon 22 and the battery icon 23, and a flow icon 25B (see FIG. 4) displayed between the battery icon 23 and the driving wheel icon 24. In the hybrid vehicle 100, electric power of the battery 4 is not directly supplied to the driving wheel 8. However, since there is relevancy between a driving state of the driving wheel 8 and a driving state of the electric motor 6, the direction of electric power supply between the battery 4 and the electric motor 6 is displayed as an energy flow between the battery icon 23 and the driving wheel icon 24 on the energy flow display.

As described above, the controller 10 is configured so as to control display modes and so on of the various icons 21, 22, 23, 24, 25A, 25B. This means that the controller 10 includes a flow display control unit that controls the display modes of the flow icons 25A, 25B in accordance with the vehicle traveling state, an engine rotation state display control unit that controls the display mode of the engine icon 22 in accordance with the engine rotation state (the engine rotation speed), the battery display control unit that controls the display mode of the battery icon 23 in accordance with a charge and discharge state, and a driving display control unit that controls a display mode of the driving wheel icon 24 (the vehicle driving part icon) in accordance with the vehicle traveling state. These display control units may be configured so as to be included in different controllers, respectively.

As shown in FIG. 4, when the hybrid vehicle 100 is traveling in a non-charged traveling state in which the hybrid vehicle 100 is traveling by using power from the electric motor 6 based on electric power from the battery 4 while the engine 1 is stopped, the controller 10 controls the display unit 50 so that the engine icon 22 is displayed in gray (a first display mode) based on the fact that the engine rotation speed is zero.

In the non-charged traveling state, since electric power generation by the engine 1 is not performed, the controller 10 performs control so that the flow icon 25A between the engine icon 22 and the battery icon 23 is not displayed on the vehicle state display part 20.

Meanwhile, in the non-charged traveling state, since the driving wheel 8 is driven by driving the electric motor 6 with use of the electric power of the battery 4, the controller 10 controls the display unit 50 so that the flow icon 25B between the battery icon 23 and the driving wheel icon 24 is displayed in blue. In this case, in order to show that the driving wheel 8 is driven based on electric power of the battery 4, the flow icon 25B is displayed so that a point of the arrow is directed in a direction from the battery icon 23 towards the driving wheel icon 24.

As described above, in the non-charged traveling state, in the vehicle state display part 20 of the display unit 50, the engine icon 22 is displayed in gray (the first display mode), and the flow icon 25B is displayed in blue, the flow icon 25B showing that energy (electric power) necessary for the vehicle to travel is supplied from the battery icon 23 towards the driving wheel icon 24.

The flow icon 25B in the non-charged traveling state is configured so that its thickness is changed in accordance with a magnitude of electric power supplied from the battery 4 to the electric motor 6. Therefore, when, for example, supply electric power is larger than reference supply electric power, the controller 10 controls the display unit 50 so that the flow icon 25B is displayed to be thicker than the flow icon 25B when the supply electric power is smaller than the reference supply electric power. The controller 10 may be configured to control the display unit 50 so that the flow icon 25B becomes gradually thicker as the supply electric power becomes larger.

Figure 5:
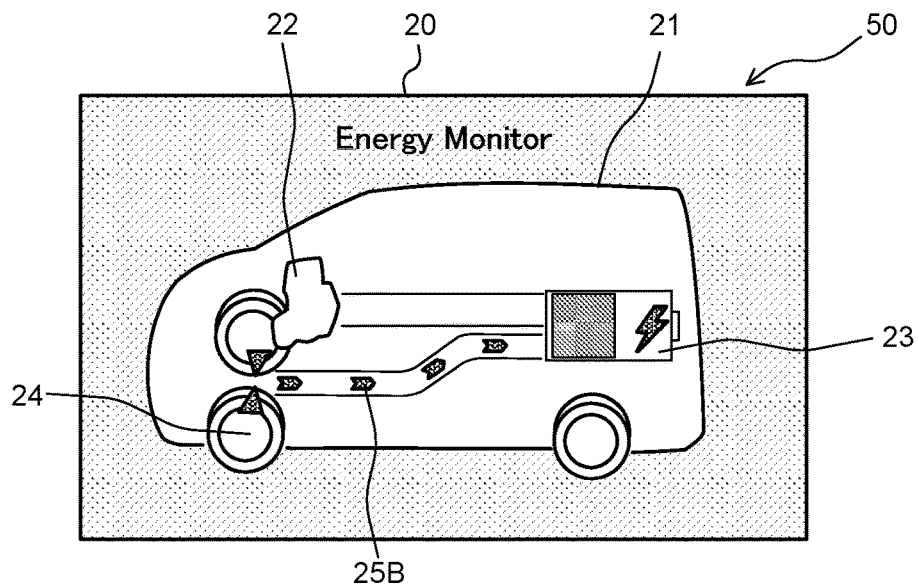
FIG. 5 is a view showing a display state of the display unit in a case where the hybrid vehicle is decelerating in a state where the engine is stopped, and regenerative charge is performed by the electric motor.

Next, described with reference to FIG. 5 is a display state of the vehicle state display part 20 when the hybrid vehicle 100 travels while decelerating in a state where the engine 1 is stopped and regenerative charging is performed by the electric motor 6.

In such a regenerative charging traveling state, the controller 10 performs control so that the engine icon 22 is displayed in gray (the first display mode) based on the fact that the engine rotation speed is zero, and that the flow icon 25A between the engine icon 22 and the battery icon 23 is not displayed.

Meanwhile, in the regenerative charging traveling state, the electric motor 6 is driven to rotate with rotation of the driving wheel 8, and electric power generated by the electric motor 6 is charged in the battery 4. Therefore, the controller 10 controls the display unit 50 so that the flow icon 25B between the battery icon 23 and the driving wheel icon 24 is displayed in blue. In this case, the flow icon 25B is displayed so that a point of the arrow is directed in a direction from the driving wheel icon 24 towards the battery icon 23 in order to show that the battery 4 is regeneratively charged by electric power generation in the electric motor 6 based on the rotation of the driving wheel 8. Further, in order to make it easier to grasp that the battery 4 is being charged, the controller 10 causes a charge icon imitating a lightening shape to be displayed in the battery icon 23.

As described above, in the regenerative charging traveling state in the state where the engine is stopped, on the vehicle state display part 20 of the display unit 50, the engine icon 22 is displayed in gray (the first display mode), and the flow icon 25B is shown in blue, the flow icon 25B showing that energy (electric power) from regenerative charging is supplied from the driving wheel icon 24 to the battery icon 23. When regenerative charging is carried out by the electric motor 6, the flow icon 25B is set in the same display mode (blue) as the display mode in the case where the driving wheel 8 is driven by the electric motor 6.

The flow icon 25B is configured so that its thickness is changed in accordance with a magnitude of the regenerative electric power charged in the battery 4 from the electric motor 6. Therefore, when, for example, the regenerative electric power is larger than reference regenerative electric power, the controller 10 controls the display unit 50 so that the flow icon 25B is displayed to be thicker than the flow icon 25B when the regenerative electric power is smaller than the reference regenerative electric power. In this embodiment, a value of the reference regenerative electric power that serves as a reference for thickness adjustment of the flow icon 25B at the time of regenerative charging is set so as to be larger than the value of the reference supply electric power that serves as a reference for thickness adjustment of the flow icon 25B at the time of non-charging traveling. Further, the controller 10 may be configured so as to control the display unit 50 so that a thickness of the flow icon 25B gradually increases as the regenerative electric power increases.

Figure 6:
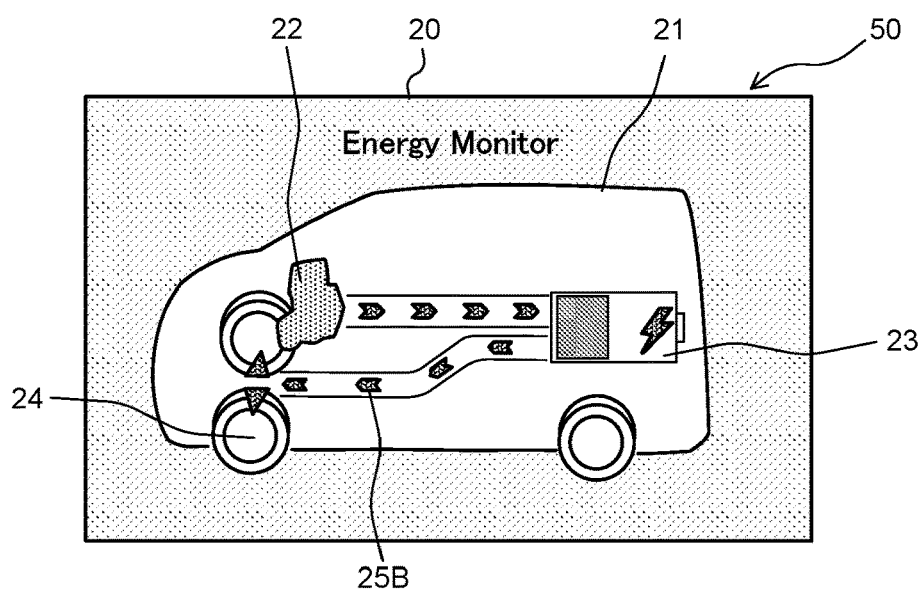
FIG. 6 is a view showing a display state of the display unit in a case where the hybrid vehicle is traveling by the electric motor while a battery is being charged by electric power generation by the engine.

Described with reference to FIG. 6 is a display state of the vehicle state display part 20 in the case where the hybrid vehicle 100 is traveling by the electric motor 6 while the battery 4 is being charged by electric power generation by the engine 1.

When a drop of the SOC of the battery 4 or the like is detected while the hybrid vehicle 100 is traveling normally, the generator 2 is driven with use of power of the engine 1, and electric power generated in the generator 2 is charged in the battery 4. In this normal traveling state at the time of charging, the engine 1 is controlled so as to operate at an operating point with good fuel economy efficiency in accordance with the vehicle traveling state.

In the normal traveling state at the time of charging, the controller 10 calculates engine rotation speed based on the detection signal of the crank angle sensor 13, and determines whether or not the calculated engine rotation speed is equal to or lower than the reference rotation speed. When the engine rotation speed is equal to or lower than the reference rotation speed, the controller 10 causes the engine icon 22 to be displayed in green (a second display mode) so that it is visually recognized that the engine 1 is controlled in an appropriate driving state such as that the engine 1 is controlled with good fuel economy efficiency. The reference rotation speed is determined in advance based on experiments, evaluations, and so on, and is set to rotation speed at which a driver in general would feel that the engine sound is loud. For example, the reference rotation speed is set to 2500 rpm.

In the normal traveling state at the time of charging, since the battery 4 is charged by electric power generation by the engine 1, the controller 10 controls the display unit 50 so that the flow icon 25A between the engine icon 22 and the battery icon 23 is displayed in yellow. In this case, in order to show that the battery 4 is being charged by electric power generation by the engine 1, the flow icon 25A is displayed so that the point of the arrow is directed in a direction from the engine icon 22 to the battery icon 23. Further, in order to make it easier to grasp that the battery 4 is being charged, the controller 10 displays the charge icon imitating the lightening shape in the battery icon 23.

The flow icon 25A in the normal traveling state at the time of charging is configured so that its thickness is changed in accordance with a magnitude of electric power supplied to the battery 4 from the generator 2 that is driven by the engine 1. Therefore, when, for example, the charging electric power is larger than the reference charging electric power, the controller 10 controls the display unit 50 so that the flow icon 25A is displayed to be thicker than the flow icon 25A when the charging electric power is smaller than the reference charging electric power. At the time of charging with use of the engine 1, a value of the reference charging electric power that serves as a reference for adjustment of the thickness of the flow icon 25A is set to be larger than a value of the reference regenerative electric power that serves as a reference for adjustment of the thickness of the flow icon 25B while traveling at the time of regenerative charging. Also, the controller 10 may be configured to control the display unit 50 so that the thickness of the flow icon 25A gradually increases as the charging electric power increases.

Meanwhile, in the normal traveling state at the time of charging, the electric motor 6 is driven to rotate with use of the electric power of the battery 4, and the driving wheel 8 is driven by power of the electric motor 6. Therefore, the controller 10 controls the display unit 50 so that the flow icon 25B between the battery icon 23 and the driving wheel icon 24 is displayed in blue. The display control for the flow icon 25B is the same control as that in the case of the non-charged traveling state described in FIG. 3.

As described above, in the normal traveling state at the time of charging, the engine icon 22 is displayed in green (the second display mode) on the vehicle state display part 20 of the display unit 50. Further, on the vehicle state display part 20, the flow icon 25A is displayed in yellow, the flow icon 25A showing that the electric energy for charging is supplied from the engine icon 22 to the battery icon 23, and the flow icon 25B is displayed in blue, the flow icon 25B showing that energy necessary for the vehicle to travel is supplied from the battery icon 23 to the driving wheel icon 24.

Figure 7:
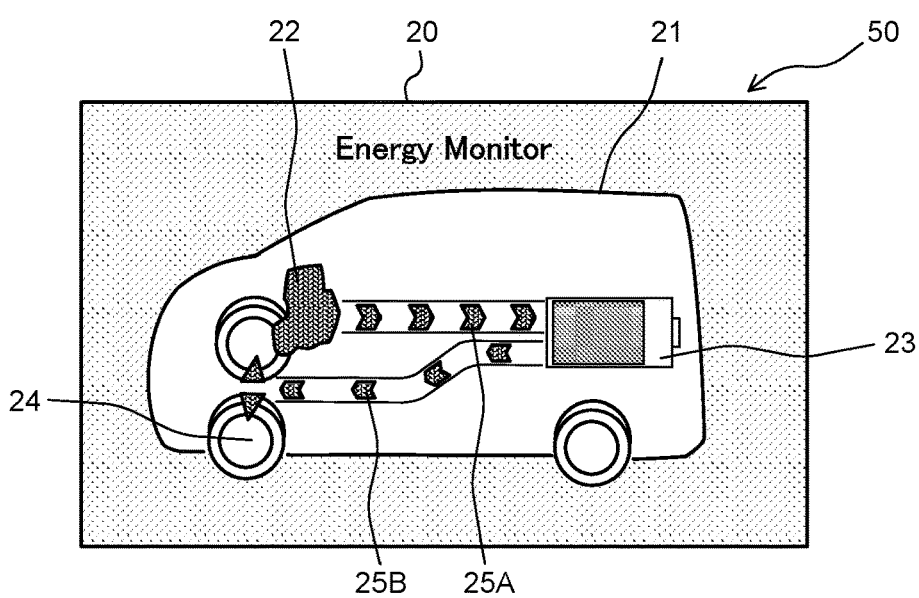
FIG. 7 is a view showing a display state of the display unit in a case where the electric motor is driven by both generated electric power from the engine and electric power of the battery, and the hybrid vehicle is accelerating.

Described with reference to FIG. 7 is a display state of the vehicle state display part 20 in a case where the electric motor 6 is driven by use of both generated electric power by the engine 1 and the electric power of the battery, and the hybrid vehicle 100 is accelerating.

In a scene where an accelerator pedal is depressed greatly by a driver, and the hybrid vehicle 100 accelerates rapidly, electric power of the battery can be insufficient as the supply electric power for the electric motor 6. In such a case, the generated electric power by the engine 1 compensates for the battery electric power, and desired electric power is thus supplied to the electric motor 6. In such an acceleration traveling state, since it is necessary to supply large electric power to the electric motor 6, generated electric power is prioritized over fuel economy, and the engine 1 is controlled with higher rotation speed and a higher load than those at the time of normal traveling. Therefore, in the acceleration traveling state, even though fuel economy of the engine 1 is sacrificed to some degree, the rotational speed of the engine 1 is increased and the generated electric power by the generator 2 is increased.

In the foregoing acceleration traveling state, the controller 10 calculates engine rotation speed based on the detection signal of the crank angle sensor 13, and determines whether or not the calculated engine rotation speed is equal to or lower than the reference rotation speed. When the engine rotation speed is larger than the reference rotation speed, the controller 10 causes the engine icon 22 to be displayed in yellow (a third display mode) so that it is visually recognizable that the engine 1 is controlled in an ineffective driving state and a state that is not recommended from a viewpoint of eco-driving such as that the engine 1 is controlled at high rotation speed.

In the acceleration traveling state, since the electric motor 6 is driven by generated electric power by the engine 1 and the electric power of the battery, the controller 10 controls the display unit 50 so that the flow icon 25A between the engine icon 22 and the battery icon 23 is displayed in yellow, and the flow icon 25B between the battery icon 23 and the driving wheel icon 24 is displayed in blue. In this case, the flow icon 25A is displayed so that the point of the arrow is directed in a direction from the engine icon 22 to the battery icon 23, and the flow icon 25B is displayed so that the point of the arrow is directed in a direction form the battery icon 23 to the driving wheel icon 24.

In the acceleration traveling state, there are instances where generated electric power by the engine 1 is larger than the foregoing reference charging electric power, and the supply electric power supplied to the electric motor 6 is also larger than the reference supply electric power. In such a case, the flow icons 25A, 25B are displayed in the thick display mode as shown in FIG. 6.

As described above, in the acceleration traveling state, the engine icon 22 is displayed in yellow (the third display mode) on the vehicle state display part 20 of the display unit 50. Further, on the vehicle state display part 20, the flow icon 25A is displayed in yellow, the flow icon 25A showing that charging electric energy is supplied from the engine icon 22 to the battery icon 23, and the flow icon 25B is displayed in blue, the flow icon 25B showing that energy necessary for the vehicle to travel is supplied from the battery icon 23 to the driving wheel icon 24.

As described by using FIG. 4 to FIG. 7, in the display system 60 (display method) of the hybrid vehicle 100 according to this embodiment, the color (the display mode) of the engine icon 22 is changed in accordance with engine rotation speed when the energy flow based on the vehicle driving state is displayed. With such a configuration, it is possible to realize the energy flow display in which the driving state of the engine 1 is taken into consideration, and a driver or the like is able to simultaneously grasp the flow of energy according to the vehicle driving state, and a type of state in which the engine 1 is controlled.

The color (the display mode) of the engine icon 22 is determined by comparison between a calculated value of the engine rotation speed and the reference rotation speed. The reference rotation speed may be a predetermined fixed value, and, as shown in FIG. 8, a value of the reference rotation speed may be determined based on vehicle speed calculated from the motor rotation speed.

Figure 8:
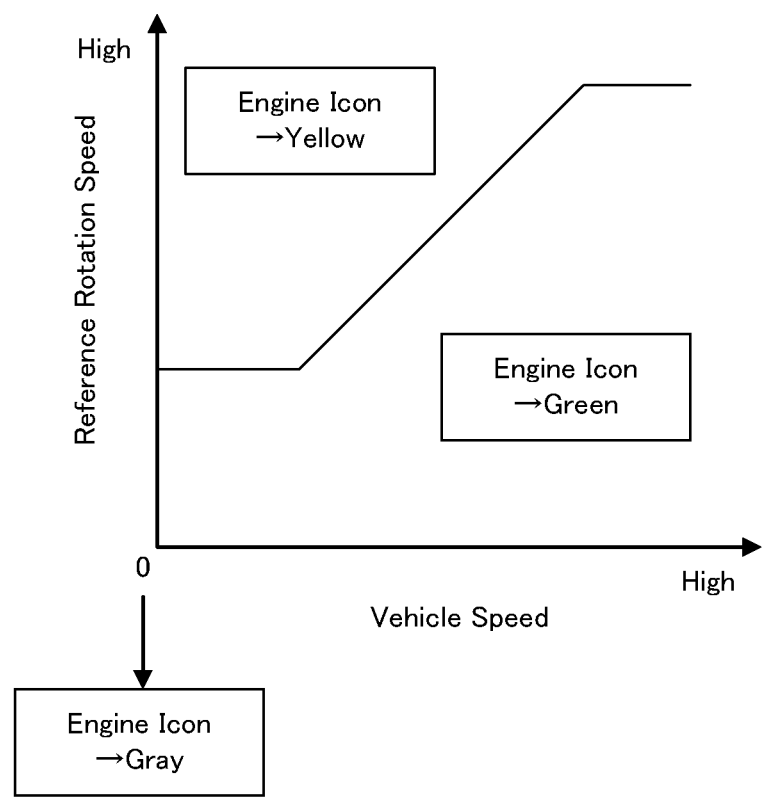
FIG. 8 is a view showing an example of a vehicle speed—reference rotation speed map.

As shown in FIG. 8, a vehicle speed—reference rotation speed map is, for example, set so that the reference rotational speed is low in a low speed region, and the reference rotation speed is high in a high speed region, and also set so that, in an intermediate speed region between the low speed region and high speed region, the reference rotation speed increases between the high reference rotation speed and the low reference rotation speed as the vehicle speed increases. The controller 10 is configured so as to control the display unit 50 so that the engine icon 22 is displayed in yellow when the calculated value of the engine rotation speed is larger than the reference rotational speed in accordance with vehicle speed at that time. The vehicle speed—reference rotation speed map shown in FIG. 8 is just an example, and may be a map in which the vehicle speed and reference rotation speed are in a directly proportional relation so that the reference rotation speed increases as the vehicle speed increases.

Although the controller 10 is configured so as to calculate vehicle speed based on the detection signal of the motor rotation angle sensor 14, the controller 10 may also be configured so as to calculate vehicle speed based on a detection signal of a vehicle speed sensor provided in the hybrid vehicle.

Figure 9:
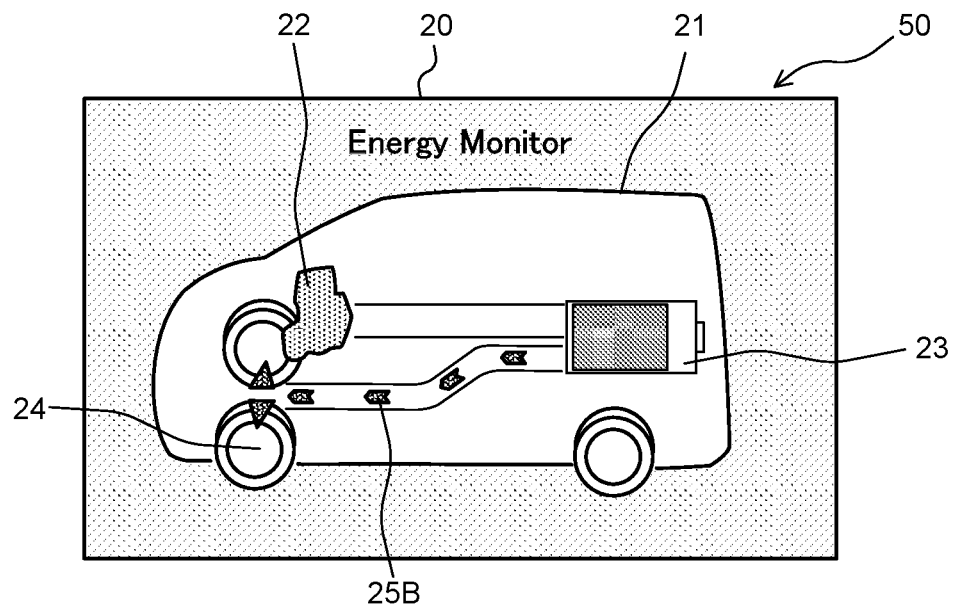
FIG. 9 is a view showing a display state of the display unit in a case where motoring control is performed so that a generator is driven based on the electric power of the battery and the engine is driven.
Figure 10:
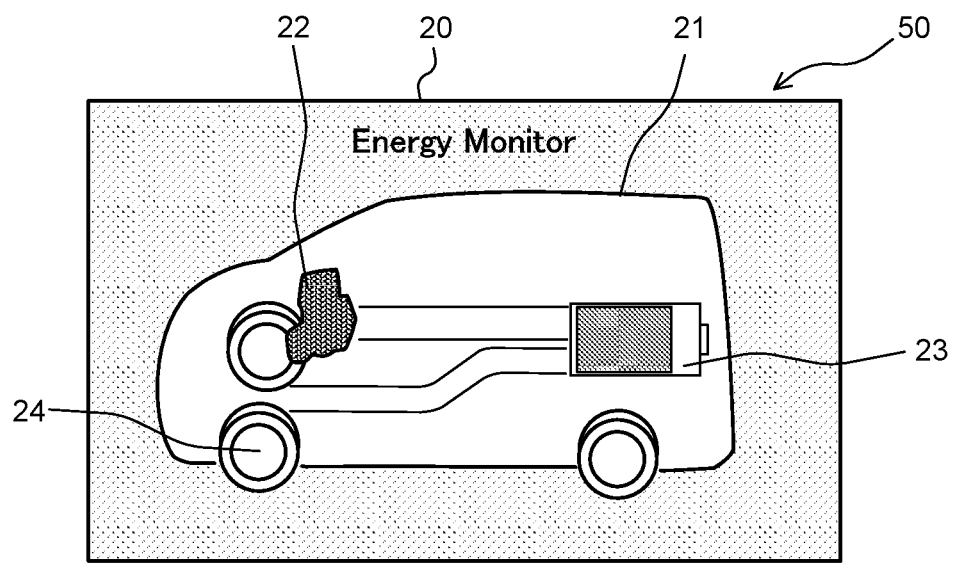
FIG. 10 is a view showing a display state of the display unit in a case where a hood is open, the hood covering an engine room in which the engine and the electric motor are accommodated.

Next, described with reference to FIG. 9 to FIG. 10 is an energy flow display on the vehicle state display part 20 of the display unit 50 in the vehicle driving state different from those in FIG. 4 to FIG. 7.

FIG. 9 is a view showing a display state of the vehicle state display part 20 in a case where motoring control is performed in which the generator 2 is operated based on electric power of the battery and the engine 1 is driven.

The motoring control is performed, for example, in a scene where generation of negative pressure for assisting the brake pedal is necessary. In such motoring control, as the engine 1 is driven by the generator 2 in the state where an intake passage of the engine 1 is closed by a throttle valve, negative pressure for assisting the brake pedal is generated inside the intake passage of the engine 1. In the hybrid vehicle 100, the motoring control is performed not only when negative pressure is generated, but also in a case where the engine 1 is cranked when the engine 1 is started, and in a case where regenerative electric power from the electric motor 6 is consumed by the generator 2 instead of being charged in the battery 4.

FIG. 9 shows an example in which the motoring control is performed in order to generate brake negative pressure when the hybrid vehicle 100 is traveling, and, at the time of the motoring control, the controller 10 controls the display unit 50 so that the flow icon 25B between the battery icon 23 and the driving wheel icon 24 is displayed in blue, and the engine icon 22 is displayed in green (the second display mode).

At the time of the motoring control, the engine 1 is driven as the generator 2 is operated based on electric power supplied form the battery 4. However, the controller 10 is configured not to display the flow icon 25A directed from the battery icon 23 to the engine icon 22 on purpose. Therefore, as shown in FIG. 9, the flow icon 25A is not shown between the engine icon 22 and the battery icon 23.

Basically, the controller 10 is configured so as to change the color of the engine icon 22 in accordance with engine rotation speed, and also to always display the engine icon 22 in green regardless of the engine rotation speed at the time of the motoring control. The motoring control is performed regardless of an accelerator pedal operation by the driver, and the engine 1 starts operating at timing that is not intended by the driver. There is a case where a driver hears sound of rotation operation of the engine 1, and, when it is not recognized that the motoring control of the engine 1 is performed, the driver may be given a sense of discomfort by the sound of the operation. However, in this embodiment, when the engine 1 is driven by the motoring control, the engine icon 22 is displayed in green (the second display mode) similarly to the case shown in FIG. 6 where the engine rotation speed is controlled so as to be equal to or smaller than the reference rotation speed. Therefore, it is possible to make the driver recognize that the engine 1 is controlled adequately. Therefore, even when the motoring control is performed regardless of an intension of the driver, it is possible to avoid that the driver is given a sense of discomfort.

Further, when the regeneration charge state continues and the battery 4 is fully charged on a downhill road, there are instances where the motoring control of the engine 1 is performed so that the engine rotation speed becomes the reference rotation speed described above, and the sound of the rotation operation becomes loud. This is done in order to increase electric power consumption by the monitoring control of the engine 1 so that overcharge of the battery 4 is prevented. Meanwhile, in the motoring control, even in the case where the engine rotation speed is higher than the reference rotation speed, the sound of rotation operation of the engine 1 is smaller at the time of the motoring control compared to the case where the engine 1 is operated by burning fuel (an engine self-destruction rotation state). This means that, in such motoring control, the engine 1 is not in an inefficient driving state. Therefore, in the motoring control, even when the engine rotation speed exceeds the reference rotation speed, the engine icon 22 is displayed in green (the second display mode) instead of yellow (the third display mode), allowing the driver to recognize that the engine 1 is controlled appropriately.

FIG. 10 is a view of a display state of the vehicle state display part 20 in a case where a hood that covers an engine room is open when the hybrid vehicle 100 is stopped, the engine room accommodating the engine 1 and the electric motor 6.

The controller 10 determines whether or not the vehicle is stopped based on vehicle speed calculated from the motor rotation speed and a detection signal from the brake pedal sensor 17, and also determines whether or not the hood is in an open state based on a detection signal from the hood opening-closing sensor 19. When the hood is in the open state while the vehicle is stopped, the controller 10 controls the display unit 50 so that the flow icons 25A, 25B are not displayed, and the engine icon 22 is displayed in yellow (the third display mode).

Although the controller 10 is configured so as to change the color of the engine icon 22 in accordance with engine rotation speed basically, the controller 10 is also configured so as to make the engine icon 22 always be displayed in yellow regardless of the engine rotation speed in the state where the hood is open. Opening the hood in a state where the engine 1 is able to operate is not recommended for safety reasons and so on. Therefore, in this embodiment, when the hood is open, the engine icon 22 is displayed in yellow (the third display mode) similarly to the case where the engine rotation speed is controlled so as to be larger than the reference rotation speed as shown in FIG. 7. Therefore, it is possible to make the driver recognize that the engine 1 is in an environment that is not recommended from a viewpoint of eco-driving and so on. The controller 10 may also be configured so as to display the engine icon 22 in yellow (the third display mode) whether or not the vehicle is stopped when the hood is open.

The controller 10 controls the display unit 50 so that the engine icon 22 is displayed in yellow when the hood is in the open state, and the controller 10 may also control the display unit 50 so that the engine icon 22 is displayed in yellow (the third display mode) when the accelerator pedal is depressed while the shift lever is in the P range, showing that the engine 1 is operated in a state that is not recommended. In this case, the controller 10 determines whether or not the shift lever is in the P range based on the detection signal from the position sensor 18, and also determines whether or not the acceleration pedal is depressed based on the detection signal from the accelerator pedal sensor 16.

As described above, when the engine 1 is in the state that is not recommended from a viewpoint of eco-driving and so on, the controller 10 causes the engine icon 22 to be displayed in yellow. However, in this case, the engine icon 22 may be displayed in a color (a fourth display mode) different from gray (the first display mode), green (the second display mode), and yellow (the third display mode). For example, when red is used as the fourth display mode of the engine icon 22, it is possible to make the driver or the like strongly recognize that the engine 1 is in the state that is not recommended from the viewpoint of the eco-driving and so on.

With the foregoing display system 60 (the display method) of the hybrid vehicle 100, the following effects are obtained.

The display system 60 of the hybrid vehicle 100 is a system that displays at least an energy flow between the engine 1 and the battery 4. The display system 60 includes the display unit 50 that displays the engine icon 22 representing the engine 1, the battery icon 23 representing the battery 4, and the flow icon 25A between the engine icon 22 and the battery icon 23 representing the energy flow so that the driver is able to visually recognize the icons, and the controller 10 that controls display of the icons in accordance with a driving state of the hybrid vehicle 100. When the battery 4 is charged, the controller 10 (the flow display control unit) displays the flow icon 25A in a display mode showing that there is an energy flow between the engine 1 and the battery 4. The controller 10 (the engine rotation state display control unit) acquires a rotation state of the engine, and, when the engine 1 is stopped, the controller 10 causes the engine icon 22 to be displayed in the first display mode (for example, in gray). Further, when the engine 1 is operated at engine rotation speed equal to or lower than the reference rotation speed, the controller 10 causes the engine icon 22 to be displayed in the second display mode (for example, in green) different from the first display mode, and, when the engine rotation speed is higher than the reference rotation speed, the engine icon 22 is displayed in the third display mode (for example, in yellow) different from the first and the second display modes.

Thus, when the energy flow based on the vehicle driving state is displayed on the vehicle state display part 20 of the display unit 50, the display mode of the engine icon 22 is changed in accordance with the engine rotation speed, thereby realizing an energy flow display associated with rotation speed of the engine 1. As a result, the driver or the like is able to simultaneously grasp a flow of energy in accordance with the vehicle driving state and a type of state in which the engine 1 is controlled.

The controller 10 of the display system 60 determines whether or not motoring in which the engine 1 is driven by the generator 2 is performed, and, when the motoring is performed, the controller 10 causes the engine icon 22 to be displayed in the second display mode (for example, in green). In other words, the controller 10 (the engine rotation state display control unit) causes the engine icon 22 to be displayed in the second display mode when the engine 1 is driven to rotate by the generator 2, and also causes the engine icon 22 to be displayed in the second display mode even when the engine rotation speed is higher than the reference rotation speed. When the engine 1 is driven by the motoring control, the engine icon 22 is displayed in the second display mode similarly to the case where the engine rotation speed is controlled so as to be equal to or lower than the reference rotation speed. Therefore, even when the motoring control is performed regardless of an intension of the driver, it is possible to make the driver or the like recognize that the engine 1 is not driven unnecessarily, but is actually controlled appropriately.

The controller 10 (the flow display control unit) performs control so that the flow icon 25A is displayed in a display mode showing that there is no energy flow between the engine 1 and the battery 4 (for example, the flow icon 25A is not displayed) when the engine 1 is driven to rotate by the generator 2. When the engine 1 is driven by the motoring control, the controller 10 performs control so that the flow icon 25A is displayed in the display mode showing that there is no energy flow, thereby preventing the driver from having a sense of discomfort even when the motoring control is performed regardless of an intension of the driver.

The controller 10 (the engine rotation state display control unit) of the display system 60 determines whether or not the hood that covers the engine room is open, the engine room accommodating the engine 1, and, causes the engine icon 22 to be displayed in the third display mode (for example, yellow) when the hood is open. Further, the controller 10 (the engine rotation state display control unit) determines whether or not the accelerator pedal is depressed in the state where the shift lever is in the parking position, and causes the engine icon 22 to be displayed in the third display mode when the accelerator pedal is depressed in the state where the shift lever is in the parking position. In such a case, because the engine icon 22 is displayed in the third display mode similarly to the case where the engine rotation speed is controlled to be higher than the reference rotation speed, it is possible to make the driver or the like recognize that the engine 1 is in the state that is not recommended from a viewpoint of the operation environment for the engine. When the accelerator pedal is depressed in the state where the hood is open and the shift lever is in the parking position, similar effect can be expected by displaying the engine icon 22 in the fourth display mode (for example, in red) different from the first to third display modes.

Further, the controller 10 (the engine rotation state display control unit) of the display system 60 acquires vehicle speed of the hybrid vehicle 100, and increases the reference rotation speed as the vehicle speed increases, the reference rotation speed serving as a reference for control of the display mode of the engine icon 22. Whether or not the engine 1 is appropriately controlled from a viewpoint of eco-driving or the like changes depending on the vehicle speed. However, by adjusting the reference rotation speed in accordance with the vehicle speed, it is possible to realize the engine icon display control in accordance with the vehicle speed.

Further, the controller 10 (the engine rotation state display control unit) of the display system 60 causes the engine icon 22 to be displayed in different colors depending on the display modes (the first to fourth display modes). By using colors as the display modes, the driver is able to recognize the driving state of the engine 1 intuitively and instantaneously even during driving the hybrid vehicle 100.

Although the embodiment of the invention has been described so far, the foregoing embodiment only shows a part of application examples of the invention, and is not intended to limit the technical range of the invention to the specific configuration of the foregoing embodiment.

Figure 11:
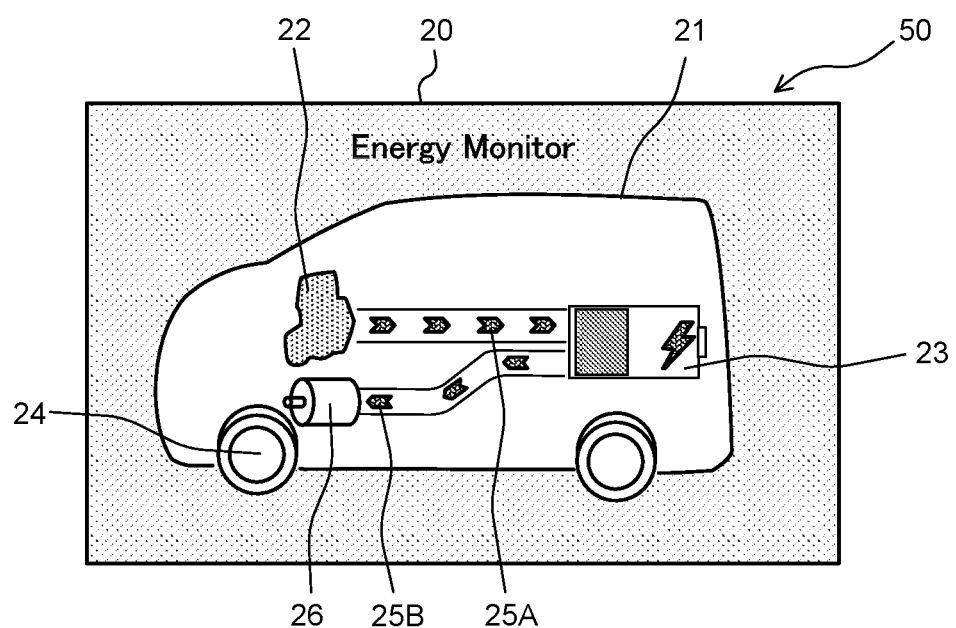
FIG. 11 is a view showing a display state of a display unit in a display system according to a modification of the embodiment.

In this embodiment, the driving wheel icon 24 is displayed on the vehicle state display part 20 of the display unit 50. However, as shown in FIG. 11, a motor icon 26 representing the electric motor 6 that actually drives the driving wheel 8 may be displayed, and the flow icons 25A, 25B and so on may be displayed between the engine icon 22 and the battery icon 23, and between the battery icon 23 and the motor icon 26, respectively. As described above, by using the motor icon 26 instead of the driving wheel icon 24, it is also possible to realize a series of energy flow displays in which engine rotation speed is taken into consideration. The driving wheel icon 24 and the motor icon 26 function as vehicle driving part icons imaged as objects to be driven in order to drive the vehicle.

Further, description was given in the embodiment that the first display mode of the engine icon 22 is gray, the second display mode is green, the third display mode is yellow, and the fourth display mode is red. However, the display modes of the engine icon 22 are not limited to colors, and may be a size of the engine icon 22, rotation speed of a gear included in the engine icon 22, or a combination of both. When the size is used as the display mode, for example, the size of the engine icon 22 is adjusted so as to become larger in the order of the first to fourth display modes. Also, when the rotation speed of the gear is used as the display mode, for example, rotation of the gear included in the engine icon 22 is adjusted so as to be higher in the order of the first to fourth display modes.

The invention claimed is:

1. A display method for displaying at least an energy flow between an engine and a battery in a hybrid vehicle, the hybrid vehicle including a generator configured to charge the battery using power of the engine and an electric motor configured to drive a driving wheel based on electric power of the battery, the display method comprising:

displaying an engine icon representing the engine, a battery icon representing the battery, and a flow icon between the engine icon and the battery icon representing the energy flow on a display unit in accordance with a driving state of the hybrid vehicle;

displaying the flow icon in a display mode indicating that there is the energy flow between the engine and the battery when the battery is charged;

displaying the engine icon in a first display mode when the engine is stopped;

displaying the engine icon in a second display mode different from the first display mode when the engine is operated at engine rotation speed equal to or lower than reference rotation speed; and displaying the engine icon in a third display mode different from the first and second display modes when the engine rotation speed is higher than the reference rotation speed.

2. The display method according to claim 1, further comprising:

displaying the engine icon in the second display mode when the engine is driven to rotate by the generator; and displaying the engine icon in the second display mode even when the engine rotation speed via the generator is larger than the reference rotation speed.

3. The display method according to claim 1, further comprising:

displaying the flow icon in a display mode indicating that there is no energy flow between the engine and the battery when the engine is driven to rotate by the generator.

4. The display method according claim 1, further comprising:

determining whether or not a hood that covers an engine room is open, the engine room accommodating the engine; and displaying the engine icon in the third display mode or in a fourth display mode different from the first to third display modes when the hood is open.

5. The display method according to claim 1, further comprising:

determining whether or not an accelerator pedal is depressed in a state where a shift lever is at a parking position; and displaying the engine icon in the third display mode or in athe fourth display mode different from the first to the third display modes when the accelerator pedal is depressed in the state where the shift lever is at the parking position.

6. The display method according to claim 1, further comprising:

acquiring vehicle speed of the hybrid vehicle; and increasing the reference rotation speed as the vehicle speed increases.

7. The display method according to claim 1, the engine icon is displayed in different colors in accordance with the first to third display modes, respectively.

8. A display system for displaying an energy flow between an engine and a battery in a hybrid vehicle, the hybrid vehicle including a generator configured to charge the battery using power of the engine and an electric motor configured to drive a driving wheel based on electric power of the battery, the display system comprising:

a display unit configured to display an engine icon, a battery icon, and a flow icon between the engine icon and the battery icon so that the engine icon, the battery icon and the flow icon are capable of being visually recognized by a driver, the engine icon representing the engine, the battery icon representing the battery, the flow icon representing the energy flow;

a flow display control unit configured to cause the flow icon to be displayed in a display mode indicating that there is the energy flow between the engine and the battery when the battery is charged; and an engine rotation state display control unit configured to acquire a rotation state of the engine, to cause the engine icon to be displayed in a first display mode when the engine is stopped, to cause the engine icon to be displayed in a second display mode different from the first display mode when the engine is operated at engine rotation speed equal to or lower than reference rotation speed, and to cause the engine icon to be displayed in a third display mode that is different from the first and second display modes when the engine rotation speed is higher than the reference rotation speed.

9. The display system for the hybrid vehicle according to claim 8, wherein the engine rotation state display control unit causes the engine icon to be displayed in the second display mode when the engine is driven to rotate by the generator, and causes the engine icon to be displayed in the second display mode even when the engine rotation speed via the generator is higher than the reference rotation speed.

10. The display system for the hybrid vehicle according to claim 8, wherein the flow display control unit causes the flow icon to be displayed in a display mode indicating that there is no energy flow between the engine and the battery when the engine is driven to rotate by the generator.

11. The display system for the hybrid vehicle according to claim 8, wherein the engine rotation state display control unit determines whether or not a hood that covers an engine room is open, the engine room accommodating the engine, and causes the engine icon to be displayed in the third display mode or in a fourth display mode different from the first to third display modes when the hood is open.

12. The display system for the hybrid vehicle according to claim 8, wherein the engine rotation state display control unit determines whether or not an accelerator pedal is depressed in a state where a shift lever is at a parking position, and causes the engine icon to be displayed in the third display mode or in a fourth display mode different from the first to third display modes when the accelerator pedal is depressed in the state where the shift lever is at the parking position.

13. The display system for the hybrid vehicle according to claim 8, wherein the engine rotation state display control unit acquires vehicle speed of the hybrid vehicle, and increases the reference rotation speed as the vehicle speed increases.

14. The display system for the hybrid vehicle according to claim 8, wherein the engine rotation state display control unit causes the engine icon to be displayed in different colors in accordance with the display modes, respectively.

* * * * *